US010904230B2

United States Patent
Aluvala et al.

(10) Patent No.: US 10,904,230 B2
(45) Date of Patent: Jan. 26, 2021

(54) DISTRIBUTED ENCRYPTION

(71) Applicant: VMWARE, INC., Palo Alto, CA (US)

(72) Inventors: Suman Aluvala, Bangalore (IN); Ramani Panchapakesan, Bangalore (IN); Rajneesh Kesavan, Bangalore (IN); Arjun Kochhar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 245 days.

(21) Appl. No.: 15/898,670

(22) Filed: Feb. 19, 2018

(65) Prior Publication Data

US 2019/0166107 A1 May 30, 2019

(30) Foreign Application Priority Data

Nov. 29, 2017 (IN) .............................. 201741042780

(51) Int. Cl.
| | | |
|---|---|---|
| *G06F 21/64* | (2013.01) | |
| *H04L 9/32* | (2006.01) | |
| *H04L 9/08* | (2006.01) | |
| *H04L 29/06* | (2006.01) | |

(52) U.S. Cl.
CPC .......... *H04L 63/0485* (2013.01); *G06F 21/64* (2013.01); *H04L 9/0894* (2013.01); *H04L 9/3247* (2013.01); *H04L 9/3263* (2013.01); *H04L 9/3268* (2013.01); *H04L 63/123* (2013.01); *H04L 2209/80* (2013.01)

(58) Field of Classification Search
CPC . H04L 63/0485; H04L 9/0894; H04L 9/3247; H04L 9/3263; H04L 9/3268; H04L 63/123; H04L 2209/80; G06F 21/64
See application file for complete search history.

(56) References Cited

U.S. PATENT DOCUMENTS

| | | | | |
|---|---|---|---|---|
| 2014/0164776 | A1* | 6/2014 | Hook .................. | G06F 21/6218 713/171 |
| 2017/0264440 | A1* | 9/2017 | Li .......................... | H04W 12/08 |
| 2017/0272209 | A1* | 9/2017 | Yanovsky ............ | G06F 12/0253 |
| 2018/0123804 | A1* | 5/2018 | Smith ................... | H04L 9/3263 |

\* cited by examiner

*Primary Examiner* — Lynn D Feild
*Assistant Examiner* — Vladimir I Gavrilenko
(74) *Attorney, Agent, or Firm* — Clayton, McKay & Bailey, PC

(57) ABSTRACT

Examples described herein include systems and methods for performing distributed encryption across multiple devices. An example method can include a first device discovering a second device that shares a network. The device can identify data to be sent to a server and calculate a checksum for that data. The device can then split the data into multiple portions and send a portion to the second device, along with a certificate associated with the server for encrypting the data. The first device can encrypt the portion of data it retained. The first device can receive an encrypted version of the second portion of the data sent to the second device. The first device can merge these two portions and send the merged encrypted data to the server, along with the checksum value. The server can decrypt the data and confirm that it reflects the original set of data.

20 Claims, 4 Drawing Sheets

DISTRIBUTED ENCRYPTION

RELATED APPLICATIONS

Benefit is claimed under 35 U.S.C. 119(a)-(d) to Foreign Application Serial No. 201741042780 filed in India entitled "DISTRIBUTED ENCRYPTION", on Nov. 29, 2017, by VMware, Inc., which is herein incorporated in its entirety by reference for all purposes.

BACKGROUND

The development of the "internet of things" ("IoT") has led to an increasing number of devices capable of connecting to the internet. A modern home, for example, might include internet-capable devices such as a thermostat, refrigerator, television, security camera, door locks, website portal, and lighting. Some of these devices can collect information and transmit it wirelessly. For example, a smart thermostat can include a sensor that detects the presence of a user, causing the thermostat to adjust based on the presence or absence of the user and transmitting this information to the user's mobile device. As another example, a refrigerator can detect when a food item is running low and either alert the user or order a replacement food item automatically.

Many IoT devices send and receive information by communicating with an external device or server. For example, a smart door-lock system can send status updates to a server, allowing a user to access the server from a user device and view the status updates remotely. These data transmissions can contain sensitive information, such as an indication of whether a home has been temporarily vacated. To increase the security of these transmissions, a device could encrypt the data before sending it outside of the local network. However, encryption can have a high cost in terms of processing power and power consumption. Design constraints prevent many IoT devices from being able to encrypt transmissions. For example, the IoT device may not have the processing power required to perform the encryption. Even if it does, performing encryption may cause the IoT device to send less data or transmit less frequently than otherwise desired. Consequently, the device might need to be designed with more processing power and a larger power requirement, raising the overall cost of the device.

As a result, a need exists for systems and methods for performing distributed encryption across multiple devices. Rather than placing the encryption burden on the device attempting to send data, the encryption can be spread across multiple devices—some of which would otherwise be sitting idly.

SUMMARY

Examples described herein include systems and methods for performing distributed encryption across multiple devices. The multiple devices can include any type of device, such as any of the IoT devices described above, phones, laptops, desktop computers, smart watches, and any other device with a processor, memory store, and ability to send and receive data.

An example method can include a first device discovering a second device that shares a network, such as a home WIFI network. The discovery process can be used to identify other devices on the network and potentially learn additional information about those devices, such as battery life or processing power. The first device can identify data to be sent to a server. For that data, the first device can calculate a checksum. The first device can then split the data into multiple portions and send a portion of the data to the second device. Along with that portion of data, the first device can also send a certificate associated with the server, to be used for encrypting the data. The first device can retain a portion of data to encrypt itself. While the device can send all of the data to other devices for encryption in one example, retaining a portion of the data can provide greater security against an intruder monitoring the traffic on the local network.

The first device can then encrypt the portion of data it retained, using the certificate associated with the server. The first device can then receive an encrypted version of the second portion of the data that was sent to the second device. The first device can merge these two portions. It can then send the merged encrypted data to the server, along with a checksum value. The device can also provide information regarding the number of encrypted portions used to form the merged encrypted data. It can also provide a sample size of the data to the server. The server can use some or all of this information to decrypt the data and confirm that it reflects the original set of data.

This process can be spread across more than two devices. For example, the first device can split the data into three portions and send the third portion (with the certificate) to a third device. The third device can send an encrypted third portion back to the first device. The first device can then merge the encrypted first, second, and third portions before sending the merged encrypted data to the server.

The first device can select the additional devices for performing encryption based on a variety of factors. For example, an additional device can be selected based on whether it is on battery power, and if so, a battery level. This information can be gathered at the discovery stage, in one example. The first device can perform one or more of the stages in the method based on a digitally signed command from the server.

The example methods summarized above can be incorporated into a non-transitory, computer-readable medium having instructions that, when executed by a processor associated with a computing device, cause the processor to perform stages for performing distributed encryption across multiple devices. Additionally, the example methods summarized above can be implemented in a system including, for example, a first device, a second device, a server, or any combination thereof.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for performing distributed encryption across multiple devices. In one example method, a first device can discover a second device that shares a network with the first device. The first device can identify data to be sent to a server and calculate a checksum for that data. The first device can then split the data into multiple portions and send a portion to the second device, along with a certificate associated with the server for encrypting the data. The first device can encrypt the portion of data it retained. The first device can receive an encrypted version of the second portion of the data sent to the second device. The first device can merge these two portions and send the merged encrypted data to the server, along with the checksum value. The server can decrypt the data and confirm that it reflects the original set of data.

Figure 1:
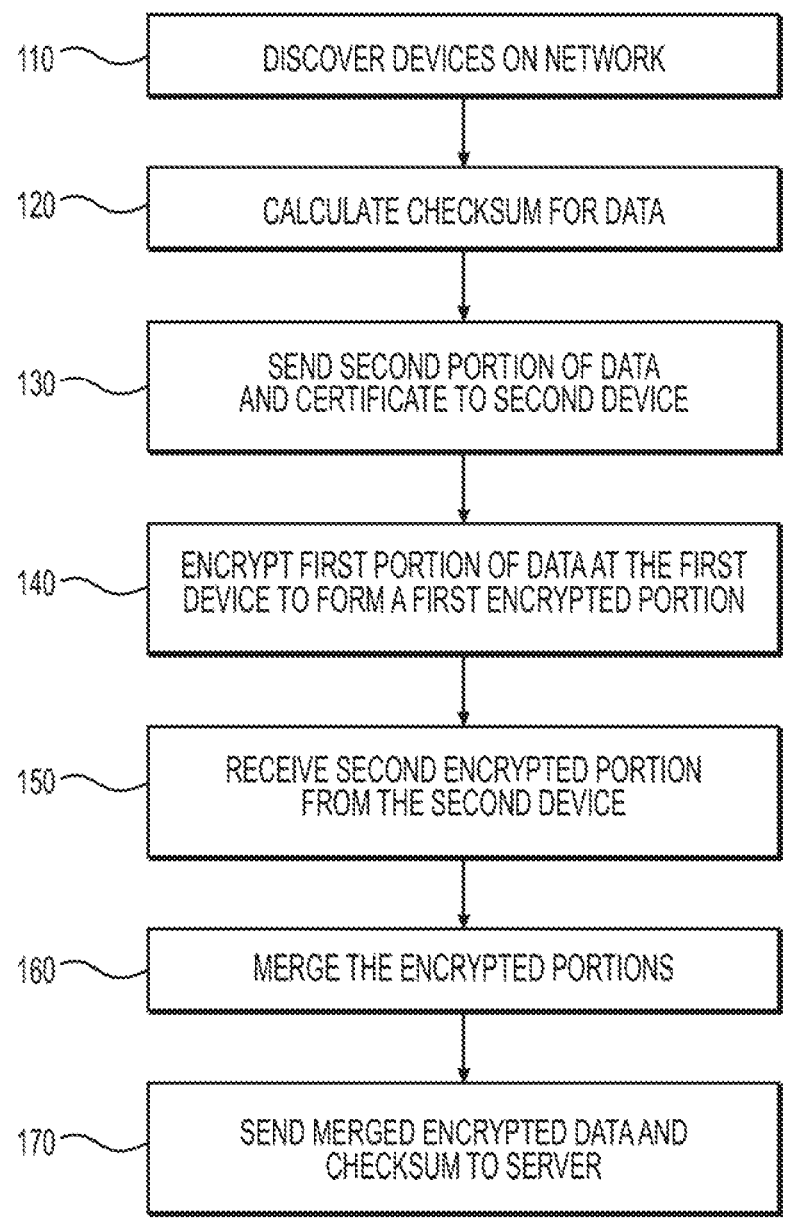
FIG. 1 is a flowchart of an exemplary method for using distributed encryption to send data from a first device to a server.
Figure 2:
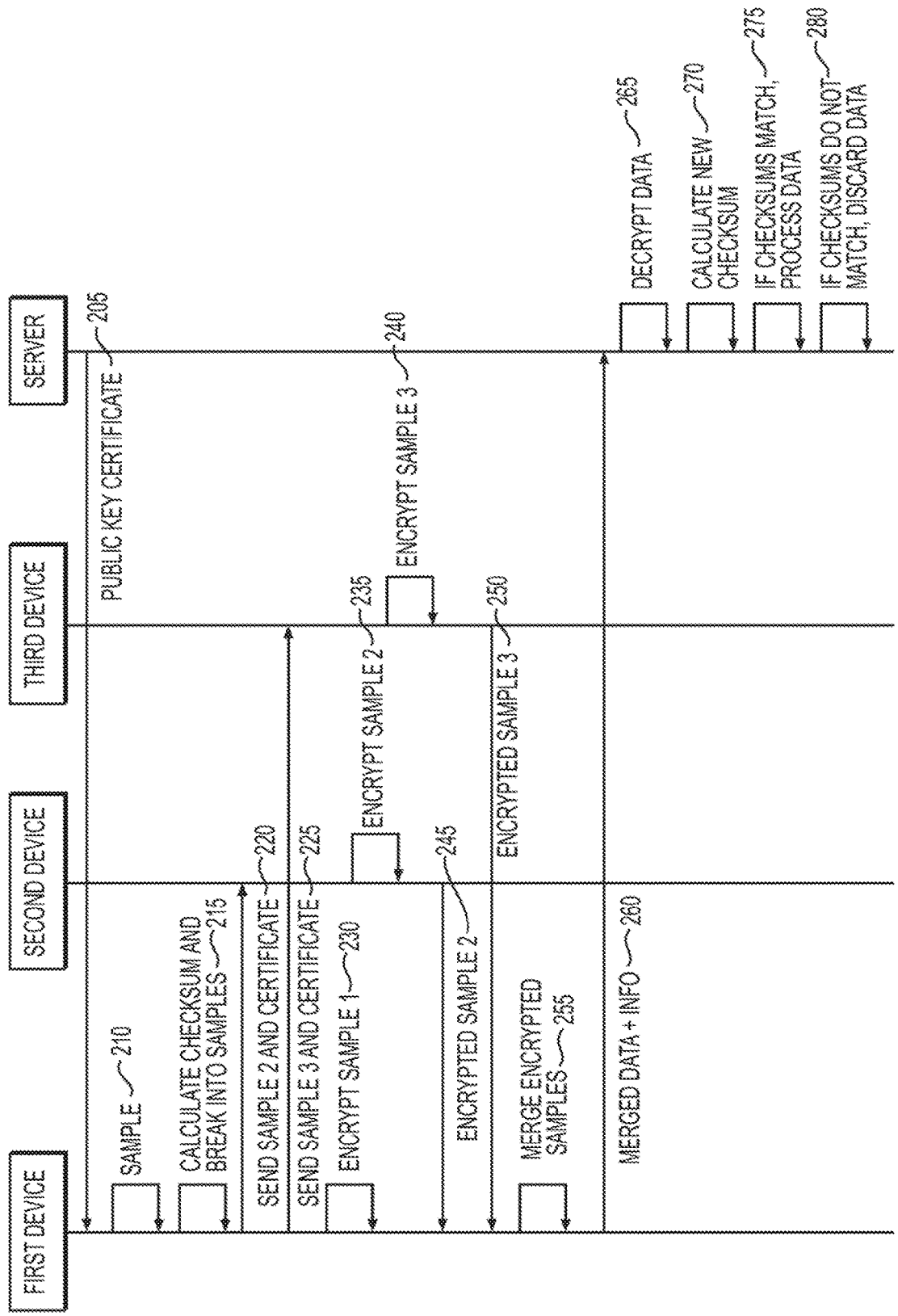
FIG. 2 is a flowchart of an exemplary method for using distributed encryption to send data from a first device to a server.
Figure 3:
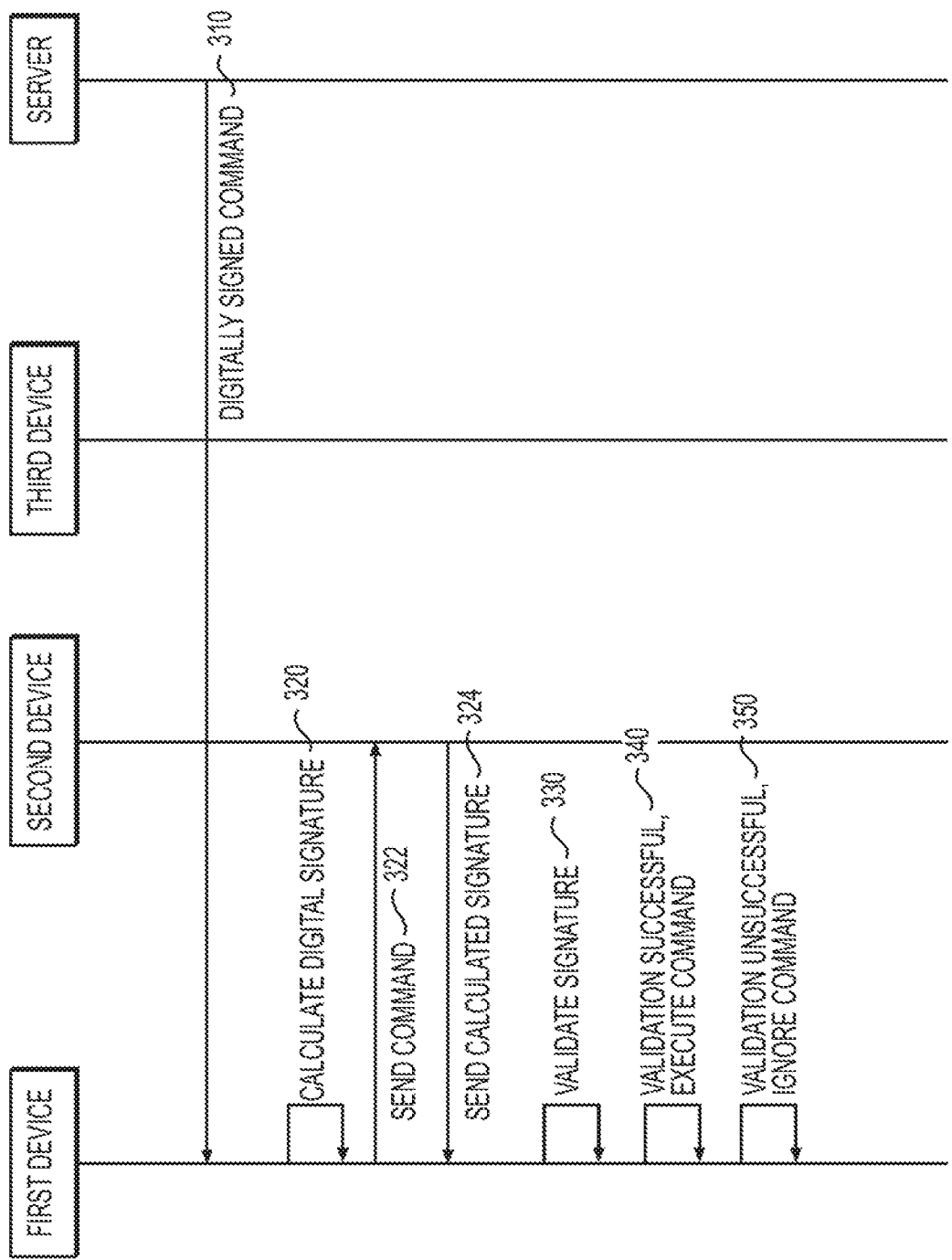
FIG. 3 is a flowchart of an exemplary method for validating instructions from a server at a device.
Figure 4:
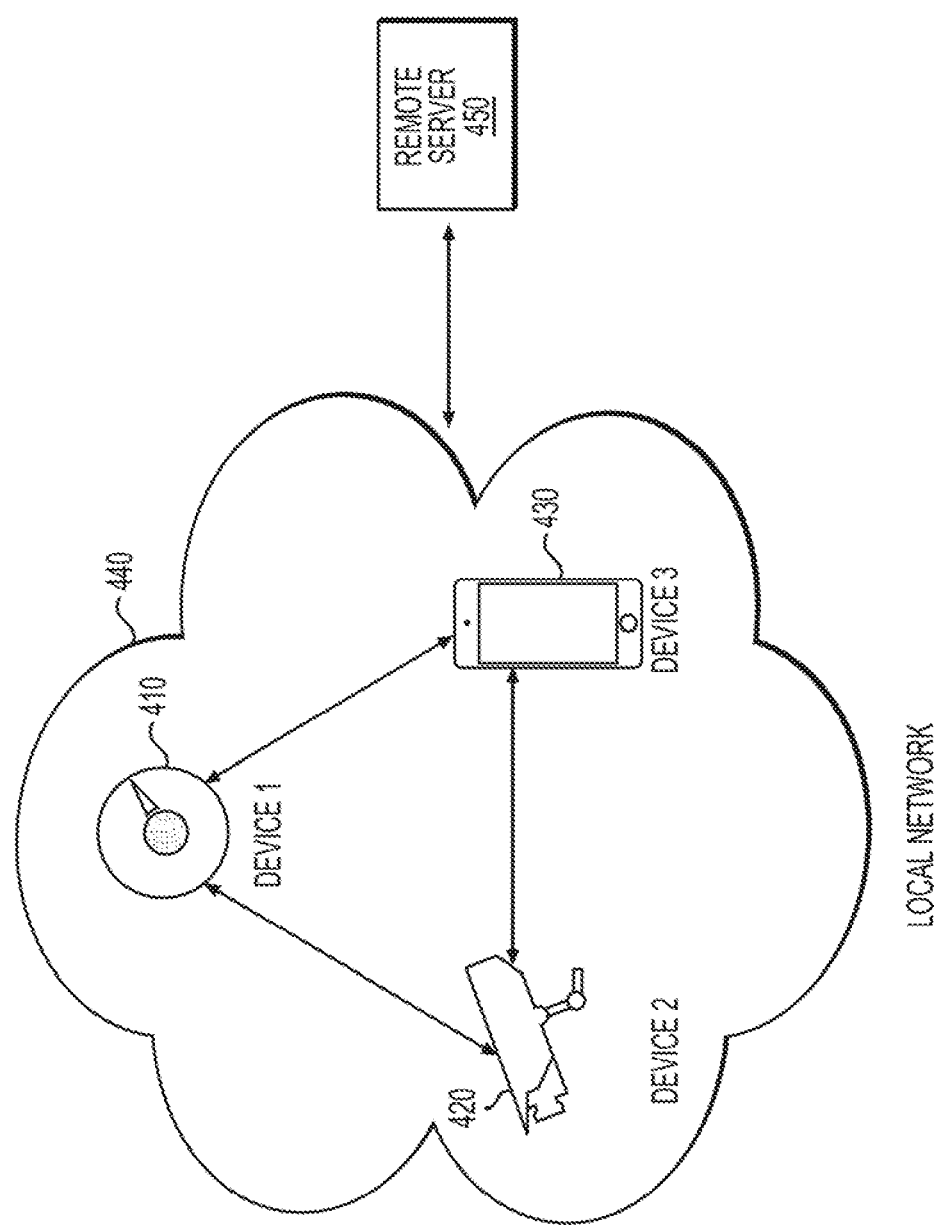
FIG. 4 is an exemplary illustration of system components for using distributed encryption to send data from a first device to a server.

FIG. 1 provides a flowchart of an example method for performing distributed encryption across two devices, while FIG. 2 provides a flowchart of an example method for performing distributed encryption across three devices. FIG. 3 provides a flowchart of an example method for receiving and validating digitally signed commands from a server, and potentially using other devices to assist in the validation process. FIG. 4 provides an illustration of example system components for performing the various methods described herein.

Turning to FIG. 1, at stage 110 of the method, a first device can discover other devices on the network. Typical IoT devices can include, for example, thermostats, refrigerators, televisions, security cameras, door locks, website portals, and lighting. Devices, including the first device, can include one or more sensors, displays, processors, and other components. The devices can generate data and transmit it to other devices. In some examples, a device is a phone, PC, laptop, or other type of computing device. A device can also be a "gateway," such as a device that coordinates functions, instructions, or data sharing between multiple IoT devices.

The discovery process can include identifying other devices on the network. In one example, the network is a WIFI network within a home, workplace, or public space. The network can be any local network that allows the devices to communicate with each other without requiring use of the internet, for example. In addition to discovering other devices on the network, the discovery process can include gathering information about those other devices. In some examples, the first device can determine whether a discovered device is running on battery power or is plugged into a consistent power source. In another example, the first device can not only determine whether a discovered device is running on battery power, but also determine the current battery level of the device. In yet another example, the first device can determine information related to the computing power of the discovered device, such as the processor speed, size and type of memory, and any other relevant factors.

Discovery can be performed using software installed on the first device any other devices on the network. For example, IoT devices can include management software, such as an IoT agent. The IoT agent can receive multicast messages and respond to them, indicating that the respective device is on the network. This response can also include other information about the device, including whether the device is battery operated, a battery level, whether battery power is being used, processing power, available storage space, available memory, current processing load, how much longer the device will be awake, and any other relevant information.

The first device can also include a management agent. The management agent can be an application, installed on the first device, that allows an enterprise to manage functional aspects of the device. The enterprise can manage these functions by configuring policies and compliance rules at a management server. The management server can install the policies on the first device to be enforced by the management agent. If policies or compliance rules are not followed, the management server can cause the management agent to take remedial actions with the device.

Discovery can be performed even where a device does not include a management agent. For example, an open-source discovery protocol such as BONJOUR can be used to perform discovery. In another example, BLUETOOTH discovery can be used to identify devices based on available BLUETOOTH functionality or components. Of course, other forms of near-field communication (NFC) can be used in a similar method to BLUETOOTH. In yet another example, discovery can be performed by ANDROID NEARBY, which can identify devices running an ANDROID operating system. Discovery using NFC can provide additional security, as transmissions over a network are subject to being intercepted or altered by unwanted parties.

Stage 120 of the method can include identifying, by the first device, the data that is to be transmitted. For example, some IoT devices transmit status updates at predefined intervals. Other IoT devices, such as a smart security camera, might transmit data based on a triggering event, such as the detection of motion within the camera's field of view. Regardless of the reason for the data transfer, stage 120 can include identifying the data to be transmitted outside the network. In one example, the data is to be transmitted to a remote server. The remote server can store the data and provide functionality to a user, such as by allowing a user to access data at the remote server through an application on the user's phone or computer.

Stage 120 can also include calculating a checksum for a set of data to be transmitted outside the network. The checksum can be calculated by executing a checksum function or checksum algorithm. A checksum function or algorithm will output a significantly different value if even small changes are made to the data. This can allow the server to verify the integrity of the data it receives at a later stage of the method.

The server can issue a public key certificate to the first device. The public key certificate can be used to encrypt the data in a manner that will allow the server to decrypt it at a later time.

At stage 130, the first device can separate the data to be transmitted into multiple portions. Any number of portions may be used, but for the sake of simplicity, only two portions will be used for this example. FIG. 2 provides an example where three portions are used. In some examples, the first device can retain a portion to be encrypted at the first device. This prevents the entire set of unencrypted data from being transmitted within the local network, which could expose the data to security threats.

Stage 130 can include sending a second portion of the data to a second device on the local network. Along with the second portion of data, the first device can also send the public key certificate, associated with the server, to the second device. The second device can then use the public key certificate to encrypt the second portion of the data.

At stage 140, the first device can encrypt the first portion of the data that it retained. This can include using the public key certificate issued by the server. The encrypted first portion can be considered a first encrypted portion of the data.

At stage 150, the first device can receive a second encrypted portion of the data from the second device. Because the data was initially split into only two portions, the first and second encrypted portions comprise the entire set of data in encrypted format. The first device can merge these two portions of encrypted data at stage 160 to form merged encrypted data. In examples where the first device splits the data into more than two portions, it can receive two or more portions of encrypted data from the other devices and merge them to form the merged encrypted data. Merging can include adding a header to the payload. An example payload can include, for example: [1st Byte Sample Size+n bytes checksum+n bytes number of samples+[Encrypted Sample 1+Encrypted Sample 2+ . . . Encrypted Sample n]]. This example payload is shown as a byte stream, but can be any format, including XML, JSON, and MQTT, for example.

At stage 170, the first device can send the merged encrypted data to the server. It can also provide additional information that allows the server to decrypt the merged encrypted data. For example, the first device can send the checksum calculated at stage 120. The checksum allows the server to confirm the integrity of the data after decrypting it and calculating a new checksum for the decrypted data. In some examples, the first device can also send information regarding the number of portions used to encrypt the data. Because the example of FIG. 1 includes two portions, the first device can send information indicating that two portions were used for the encryption. In some examples, the first device can also send a sample size of the unencrypted data, reflecting the number of bytes in the unencrypted data before it was separated into multiple portions. This information provides the server with an additional method to ensure the accuracy of the data transmission.

As mentioned earlier, the distributed encryption can be performed across more than two devices. FIG. 2 provides an example flowchart for a method involving three devices that together perform distributed encryption. In the example of FIG. 2, a first device generates a sample of data of stage 210. The data can be encrypted, using the help of a second device and a third device, and then sent to the server for verification and processing.

The data sampled at stage 210 can include any type of data relevant to the first device. For example, if the first device is a smart thermostat, the sampled data can include information regarding the current temperature, requested temperature, and whether anyone is in the room or building which the thermostat is installed. Any other information relevant to the device can also be included. By sending this information to the server, a user can access the information remotely from a smartphone, regardless of their location. But this data needs to be encrypted before being sent to the server, as it can contain an indication of whether a house or office is vacant.

The first device can receive a public key certificate from the server at stage 205. This stage can occur before or after the sampling at stage 210. The public key certificate can be used to encrypt the data. That way, when the server receives the encrypted data, it can use a corresponding private key to decrypt the data.

At stage 215, the first device can calculate a checksum for the sampled data. The checksum can be calculated by executing a checksum function or checksum algorithm and applying it to the sampled data. A checksum function or algorithm will output a significantly different value if even small changes are made to the data. This can allow the server to verify the integrity of the data it receives at a later stage, after decrypting the data. If any data is changed or lost during the encryption and transmission processes, then the resulting checksum will not match the checksum calculated at stage 215.

Stage 215 can also include breaking the data sample into multiple portions, also referred to as "samples." For the purposes of this example, the original sample is split into three equal-sized samples: Sample 1, Sample 2, and Sample 3. The samples need not be equal sizes, and need not be limited to three portions. In some examples, a standard sample size is used for each portion. Additionally, although this example describes a single sample being sent to each device assisting with the encryption, the first device can transmit multiple samples to a single device for encryption. As part of the process of breaking the original sample into portions, the first device can track the overall number of samples. In one example, a larger sample can be sent to the second device than the third device based on the second device having more processing power than the third device.

At stage 220, the first device sends Sample 2 and the public key certificate to the second device. Similarly, at stage 225, the first device sends Sample 3 and the public key certificate to the third device. Any of Samples 1, 2, and 3 could be sent to the second or third devices, but this example simplifies the process by matching Sample 2 with the second device and Sample 3 with the third device. Sample 1 is retained at the first device in this example. In other examples, Sample 1 could be transmitted to another device, including the second or third device. However, sending all of the unencrypted portions of the sample on the local network can expose the data to attacks or interception.

Stages 220 and 225 can be carried out in response to the first device selecting additional devices to assist in the encryption process. The selection can be based on any relevant criteria. In one example, the first device can recruit any other device discovered during the discovery process described in stage 110 of FIG. 1. In another example, the first device can recruit other devices based on their available processing power. For example, the first device can request information from the additional device regarding the current CPU and memory utilization rates. This information can also be provided during the discovery stage. In another example, the first device can select the additional device based on a current battery level of the additional device. If several devices are available but one or more have battery levels below a threshold, such as 20%, then the first device can select only the devices that have battery levels above 20% or are currently charging. The first device can also select an additional device based on the device utilizing consistent AC or DC power, such as from a power outlet, rather than battery power. The first device can request any of this information at any time when performing the method.

At stage 230, the first device encrypts Sample 1 using the public key certificate provided to the first device at stage 205, resulting in a first encrypted sample ("Encrypted Sample 1"). The encryption can include any encryption process that involves the public key certificate. The server will retain a decryption key that allows it to decrypt the data encrypted with the public key. Although this example describes using a public key certificate to perform the encryption, the first device can alternatively or additionally use a symmetric or private key. In that example, the server provides a private key certificate and retains a duplicate private key certificate for decryption purposes. But because the security of the first device might be lower than the server, the server can issue a public key in order to keep the decryption key secret and increase the overall security of the system.

At stage 235, the second device can encrypt Sample 2 using the public key received at stage 220, resulting in a second encrypted sample ("Encrypted Sample 2"). The encryption can include any encryption process that involves the public key certificate. As explained above, the server will retain a decryption key that allows it to decrypt the data encrypted with the public key. Although this example describes using a public key certificate to perform the encryption, the second device can alternatively or additionally use a symmetric or private key in the manner explained previously.

At stage 240, the third device can encrypt Sample 3 using the public key received at stage 225, resulting in a third encrypted sample ("Encrypted Sample 3"). The encryption can include any encryption process that involves the public key certificate. As explained above, the server will retain a decryption key that allows it to decrypt the data encrypted with the public key. Although this example describes using a public key certificate to perform the encryption, the second device can alternatively or additionally use a symmetric or private key in the manner explained previously.

At stage 245, the second device can send Encrypted Sample 2 to the first device using the local network. This stage can occur directly after the encryption at stage 235. Alternatively, this stage can occur after stage 235, during a planned transmission period by the second device or in response to a request from the first device for the encrypted second portion. Similarly, the transmission at stage 245 can occur prior to the encryption of Sample 3 by the third device, described at stage 240.

At stage 250, the third device can send Encrypted Sample 3 to the first device using the local network. This stage can occur directly after the encryption at stage 240. Alternatively, this stage can occur after stage 240, during a planned transmission period by the third device or in response to a request from the first device for the encrypted third portion. Similarly, the transmission at stage 250 can take place concurrently with the transmission of the encrypted second portion from the second device to the first device.

The first device can receive the second and third encrypted portions and merge it with the first encrypted portion at stage 255. Merging the encrypted data can include, for example, packaging the data into a single file. In some examples, this stage can include applying a second layer of encryption to the data. For example, the server can issue both a first-stage and second-stage certificate at stage 205 of the method, with the first-stage certificate corresponding to a public key certificate to be used for encrypting the first, second, and third portions of the sampled data. The second-stage certificate can correspond to a public key certificate to be used for applying a second level of encryption to the combination of the encrypted first, second, and third portions. In that example, the server can store decryption keys corresponding to each of the first- and second-stage public key certificates.

Merging can include adding a header to the payload. An example payload can include, for example: [1st Byte Sample Size+n bytes checksum+n bytes number of samples+[Encrypted Sample 1+Encrypted Sample 2+ . . . Encrypted Sample n]]. This example payload is shown as a byte stream, but can be any format, including XML, JSON, and MQTT, for example.

The first device can send the merged encrypted data to the server at stage 260. As part of this stage, the first device can also send additional information to the server to be used in decrypting the merged encrypted data. For example, the first device can send the checksum value calculated at stage 215. Additionally or alternatively, the first device can send information regarding the number of encrypted portions used to form the merged encrypted data. In the example of FIG. 2, this would correspond to information indicating that the merged encrypted data was formed from three separately encrypted portions. Further, the first device can send information indicating a sample size of the data sampled at stage 210. This can include, for example, the number of bytes included in the sample. The server can use some or all of this information to ensure accurate data transmission.

At stage 265, the server can decrypt the data using the decryption key associated with the public key certificate sent to the first device at stage 205. In examples where multi-level encryption is used, the server can apply a second decryption key corresponding to the second level of encryption and then apply a first decryption key corresponding to the first level of encryption. The decryption can also be performed based on input regarding the sample size, the number of encrypted samples merged to form the merged encrypted data, or both.

At stage 270, the server can calculate a new checksum for the decrypted data. As explained earlier, any small difference between the decrypted data and the original data sample will result in significantly different checksum values. The server can then compare the new checksum to the checksum provided by the first device at stage 260. If the checksums match, then at stage 275 the server can process the data. This can include storing, manipulating, and transmitting the data. For example, the server can interpret the data and update a web portal or storage location, such that the new data is reflected when a user attempts to access the web portal or an application associated with the server.

On the other hand, if the checksums do not match, then the server can discard the data at stage 280. The server can also send a message to the first device indicating that the data was not successfully received. In some examples, the server can request a new data transmission at this time. The server can also provide a new public key certificate to the first device or request a new method of encryption, such as single-layer encryption instead of double-layer encryption.

The method described in FIG. 2 can be performed in response to a digitally signed command from the server. The digital signature can be decrypted using the public key certificate issued by the server and described in FIG. 2. An example digital-signature process is detailed in FIG. 3. At stage 310, the server sends a digitally signed command to the first device. The digital signature can be generated using a signing algorithm that produces a signature using a message and a private key. The private key can be the private key stored at the server and described with respect to FIG. 2. In another example, the private key can be another key that is designed to be decrypted using the public key provided to the first device in FIG. 2.

At stage 320, the first device can calculate a digital signature based on the public key certificate provided at, for example, stage 205 of FIG. 2. This calculation can be performed by using a signing algorithm or signature verifying algorithm at the first device. As illustrated by stages 322 and 324, the first device can recruit additional devices to assist in calculating a digital signature. For example, the first device can send the public key certificate to the second device at stage 322 and request that the second device calculate a digital signature. This can be useful in situations where the first device lacks process power or is running at low battery power. The second device can then send the calculated digital signature back to the first device at stage 324.

At stage 330, the first device can validate the signature by comparing the calculated signature to the signature provided with the command at stage 310. If the signatures are identical, then at stage 340 the validation can be considered successful and the first device can execute the command provided by the server. If, on the other hand, the signatures do not match one another, then at stage 350 the validation is considered unsuccessful and the first device can ignore the command. In some examples, an unsuccessful validation at stage 350 can prompt the first device to send a message to the server, notifying the server that a command was received but not validated successfully.

FIG. 4 provides an illustration of an example system for using distributed encryption to send data from a first device a server. FIG. 4 includes a first device 410, second device 420, and third device 430 within the same local network 440. The local network 440 can be a WIFI network, as described earlier. In other examples, the local network 440 is an NFC network. For example, the devices 410, 420, 430 can each include NFC components, such as a BLUETOOTH transceiver, for sending a receiving BLUETOOTH messages to other devices 410, 420, 430 that are in the vicinity. Therefore, the network 440 shown in FIG. 1 can be any system for communicating between the devices 410, 420, 430, and is not intended to limit this disclosure in any way.

The devices 410, 420, 430 can be any type of device, including an IoT device, that has a processor, memory store, and the capability to send and receive data. In the example of FIG. 4, the first device 410 is a smart thermostat that can collect information such as the current temperature, outdoor temperature, presence of a human or pet in the vicinity, and any other relevant information. The first device 410 can include an NFC transceiver for communicating with the other devices 420, 430. It can also include a wireless internet module for connecting to a wireless internet using a protocol such as WIFI. The first device 410 can be battery powered, connected to a more permanent power supply such as an AC or DC power outlet in a building, or both. The first device 410 can store and execute management software, such as a management agent.

The second device 420 can be any type of device, as explained above, but in the example of FIG. 4 is shown as a smart security camera. The security camera 420 can, for example, track motion, record audio and video, transmit alerts or information streams to another device or server, generate alerts to a nearby person, and allow a user to speak through an audio device located on or near the camera 420. The second device 420 can include an NFC transceiver for communicating with the other devices 410, 430. It can also include a wireless internet module for connecting to a wireless internet using a protocol such as WIFI. The second device 420 can be battery powered, connected to a more permanent power supply such as an AC or DC power outlet in a building, or both. The second device 420 can store and execute management software, such as a management agent.

The third device 430 can also be any type of device, but in the example of FIG. 4 is shown as a smartphone. The smartphone 420 can include any functionality of a phone or tablet device, including providing a display, internet connectivity via WIFI or cell phone, providing one or more NFC transceivers, and the ability to collect data from a variety of sensors, including gyroscopes, accelerometers, microphones, cameras, and biometric devices. The third device 420 can include a rechargeable battery in this example. The third device 420 can store and execute management software, such as a management agent.

Any of the devices 410, 420, 430 can be a gateway device. A gateway device can, for example, coordinate functions, instructions, or data sharing between multiple devices 410, 420, 430. In some examples, a server may communicate directly with a gateway device, and request that the gateway device forward instructions to another device specified in the instructions to the gateway.

FIG. 4 also provides a remote server 450. The remote server can be a server, computing device, or network of multiple servers or computing devices, having one or more processors and memory stores. In some examples, the server 450 is a management server that controls enrollment and compliance monitoring for one or more of the devices 410, 420, 430. For example, the server 450 can cause management software to be installed on one or more of the devices 410, 420, 430.

Each device 410, 420, 430 can send and receive messages directly to or from the remote server 450. Although FIG. 4 shows the devices 410, 420, 430 communicating to the remote server 450 from the local network 440, they can all be capable of independent communication with the remote server 450 using, for example, an internet connection. In another example, a gateway device can be used to forward communications from a device 410, 420, 430 to the remote server 450.

In an example method using the system of FIG. 4, the first device 410 can discover the other devices 420, 430 that are on the network. In this example, the phrase "on the network" includes devices that are potentially connected through NFC components rather than a traditional wireless network. As a result of the discovery phase, the first device 410 can identify the second and third devices 420, 430 and gather relevant information about the devices, such as the device type, battery level, and available CPU or memory bandwidth.

The remote server 450 can provide a public key certificate to the first device 410. The remote server 450 can send the public key certificate directly to the first device 410, or it can provide the certificate to a gateway device or one of the second and third devices 420, 430, which can then provide the certificate to the first device 410.

The first device 410 can identify the data to be transmitted to the remote server 450, calculate a checksum for that data, and then separate the data into three portions. The first device 410 can retain the first portion, while the second device 420 can receive the second portion and the third device 430 can receive the third portion. The first device 410 can send the public key certificate to the second and third devices 420, 430 if they have not received it already from the remote server 450.

The first device 410 can encrypt the retained portion of data using the public key certificate. The second and third devices 420, 430 can encrypt the second and third portions of the data, respectively—also using the public key certificate—and send the encrypted portions back to the first device 410. The first device 410 can merge these two portions of encrypted data with the first portion of encrypted data to form merged encrypted data. Merging can include adding a header to the payload. An example payload can include, for example: [1st Byte Sample Size+n bytes checksum+n bytes number of samples+[Encrypted Sample 1+Encrypted Sample 2+ . . . Encrypted Sample n]]. This example payload is shown as a byte stream, but can be any format, including XML, JSON, and MQTT, for example.

The first device 410 can then send the payload, with the new header, to the remote server 450. This can include using an internet connection, such as a connection through a wireless internet router utilizing a WIFI protocol, to send the data. The transmission can include information to be used in decrypting the merged encrypted data. For example, the first device 410 can send the calculated checksum value, information regarding the number of encrypted portions used to form the merged encrypted data, and information indicating a sample size of the data being sent. This can include, for example, the number of bytes included in the sample. The server 450 can use some or all of this information to ensure accurate data transmission.

The server 450 can decrypt the data using a private decryption key associated with the public key certificate used for encryption by the first device 410. In examples where multi-level encryption is used, the server 450 can apply a decryption key corresponding to the second level of encryption and then apply a decryption key corresponding to the first level of encryption. The decryption can also be performed based on input regarding the sample size and the number of encrypted samples merged to form the merged encrypted data.

After decryption, the server 450 can calculate a new checksum for the decrypted data. The server 450 can then compare the new checksum to the checksum provided by the first device 410. If the checksums match, the server 450 can process the data. This can include storing, manipulating, and transmitting the data. For example, the server 450 can interpret the data and update a web portal or storage location, such that the new data is reflected when a user attempts to access the web portal or an application associated with the server 450.

On the other hand, if the checksums do not match, then the server 450 can discard the data. The server 450 can also send a message to the first device 410 indicating that the data was not successfully received. In some examples, the server 450 can request a new data transmission at this time. The server 450 can also provide a new public key certificate to the first device or request a new method of encryption, such as single-layer encryption instead of double-layered encryption.

The server 450 can also send digitally signed commands to the first device 410. The digital signature can be generated using a signing algorithm that produces a signature designed to be decrypted or otherwise interpreted using the public key certificate already provided to the first device 410. For example, the first device 410 can calculate a digital signature based on the public key certificate and check to see whether the calculated digital signature matches the digital signature received from the server 450. If they match, then validation can be considered successful and the first device 410 can execute the command provided by the server 450. If, on the other hand, the signatures do not match one another, then the validation is considered unsuccessful and the first device 410 can ignore the command. In some examples, an unsuccessful validation can prompt the first device 410 to send a message to the server 450, gateway, or user, notifying that a command was received but not validated successfully.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for using distributed encryption to send data from a first device to a server, comprising:
   discovering a second device sharing a network with the first device;
   calculating a checksum for the data;
   dividing, at the first device, the data into a first portion and a second portion;
   sending, from the first device to the second device, the second portion of the data and a certificate associated with the server;
   encrypting the first portion of the data at the first device to form a first encrypted portion;
   receiving, at the first device from the second device, a second encrypted portion that is an encrypted version of the second portion of the data, wherein the second device encrypts the second portion of the data using the certificate;
   merging, at the first device, the first encrypted portion and the second encrypted portion to form merged encrypted data; and
   sending, from the first device to the server, the merged encrypted data and checksum.

2. The method of claim 1, wherein sending to the server further comprises sending information regarding a number of encrypted portions used to form the merged encrypted data.

3. The method of claim 1, wherein sending to the server further comprises sending a sample size of the data.

4. The method of claim 1, further comprising:
   sending, from the first device to a third device, a third portion of the data and the certificate associated with the server;
   receiving, at the first device from the third device, a third encrypted portion that is an encrypted version of the third portion of the data; and
   merging the first, second, and third encrypted portions to form the merged encrypted data.

5. The method of claim 1, wherein the second device is selected based, at least in part, on whether the second device is on battery power.

6. The method of claim 1, wherein receiving further comprises receiving, at the first device from the second device, an indication of a current power level of the second device.

7. The method of claim 1, wherein sending the merged encrypted data is performed in response to a digitally signed command from the server.

8. A non-transitory, computer-readable medium comprising instructions that, when executed by a processor of a user device, perform stages for using distributed encryption to send data from a first device to a server, the stages comprising:
   discovering a second device sharing a network with the first device;
   calculating a checksum for the data;

dividing, at the first device, the data into a first portion and a second portion;

sending, from the first device to the second device, the second portion of the data and a certificate associated with the server;

encrypting the first portion of the data at the first device to form a first encrypted portion;

receiving, at the first device from the second device, a second encrypted portion that is an encrypted version of the second portion of the data, wherein the second device encrypts the second portion of the data using the certificate;

merging, at the first device, the first encrypted portion and the second encrypted portion to form merged encrypted data; and sending, from the first device to the server, the merged encrypted data and checksum.

9. The non-transitory, computer-readable medium of claim 8, wherein sending to the server further comprises sending information regarding a number of encrypted portions used to form the merged encrypted data.

10. The non-transitory, computer-readable medium of claim 8, wherein sending to the server further comprises sending a sample size of the data.

11. The non-transitory, computer-readable medium of claim 8, the stages further comprising:

sending, from the first device to a third device, a third portion of the data and the certificate associated with the server;

receiving, at the first device from the third device, a third encrypted portion that is an encrypted version of the third portion of the data; and merging the first, second, and third encrypted portions to form the merged encrypted data.

12. The non-transitory, computer-readable medium of claim 8, wherein the second device is selected based, at least in part, on whether the second device is on battery power.

13. The non-transitory, computer-readable medium of claim 8, wherein receiving further comprises receiving, at the first device from the second device, an indication of a current power level of the second device.

14. The non-transitory, computer-readable medium of claim 8, wherein sending the merged encrypted data is performed in response to a digitally signed command from the server.

15. A system for using distributed encryption to send data to a server, comprising:

a first device having a processor and memory storage;

wherein the memory storage contains a non-transitory, computer-readable medium comprising instructions that, when executed by the processor, carry out stages comprising:

discovering a second device sharing a network with the first device;

calculating a checksum for the data;

dividing, at the first device, the data into a first portion and a second portion;

sending, from the first device to the second device, the second portion of the data and a certificate associated with the server, wherein the second device encrypts the second portion of the data using the certificate;

encrypting a first portion of the data at the first device to form a first encrypted portion;

receiving, at the first device from the second device, a second encrypted portion that is an encrypted version of the second portion of the data;

merging, at the first device, the first encrypted portion and the second encrypted portion to form merged encrypted data; and sending, from the first device to the server, the merged encrypted data and checksum.

16. The system of claim 15, wherein sending to the server further comprises sending information regarding a number of encrypted portions used to form the merged encrypted data.

17. The system of claim 15, wherein sending to the server further comprises sending a sample size of the data.

18. The system of claim 15, the stages further comprising:

sending, from the first device to a third device, a third portion of the data and the certificate associated with the server;

receiving, at the first device from the third device, a third encrypted portion that is an encrypted version of the third portion of the data; and merging the first, second, and third encrypted portions to form the merged encrypted data.

19. The system of claim 15, wherein the second device is selected based, at least in part, on whether the second device is on battery power.

20. The system of claim 15, wherein receiving further comprises receiving, at the first device from the second device, an indication of a current power level of the second device.

* * * * *